United States Patent
Bhat et al.

(10) Patent No.: US 10,094,901 B1
(45) Date of Patent: *Oct. 9, 2018

(54) SECURE COMMUNICATION WITH A TRAFFIC CONTROL SYSTEM

(71) Applicant: International Business Machines Corporation, Armonk, NY (US)

(72) Inventors: Gautam K. Bhat, Kadri (IN); Stacey C. Ramos, Dallas, TX (US); Gregory J. Boss, Saginaw, MI (US); Kevin C. McConnell, Austin, TX (US); Minh Q. Pham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,884

(22) Filed: Feb. 5, 2018

Related U.S. Application Data

(63) Continuation of application No. 15/621,339, filed on Jun. 13, 2017.

(51) Int. Cl.
*H04L 29/06* (2006.01)
*G01S 1/68* (2006.01)
(Continued)

(52) U.S. Cl.
CPC .............. *G01S 1/68* (2013.01); *G01S 13/825* (2013.01); *H04L 9/0819* (2013.01);
(Continued)

(58) Field of Classification Search
None
See application file for complete search history.

(56) References Cited

U.S. PATENT DOCUMENTS 6,125,323 A 9/2000 Nimura et al.
7,557,731 B2 7/2009 Ramasubbu
(Continued)

FOREIGN PATENT DOCUMENTS

CN 101051903 A 10/2007
WO 2012047708 A1 4/2012

OTHER PUBLICATIONS

Work et al., "An Ensemble Kalman Filtering Approach to Highway Traffic Estimation Using GPS Enabled Mobile Devices," Proceedings of the 47th IEEE Conference on Decision and Control, Cancun, Mexico, Dec. 9-11, 2008, pp. 5062-5068.
(Continued)

*Primary Examiner* — Eric Chen
(74) *Attorney, Agent, or Firm* — Jared L. Montanaro

(57) ABSTRACT

A processor may receive an indication form a radio frequency identification (RFID) device that a mobile device is in a predetermined area. The processor may send a private key on a first frequency at a first time to the mobile device. The processor may receive a communication request from the mobile device that may contain a public decryption key. The processor may send encrypted configuration information and encrypted state information to the mobile device. In some embodiments, an RFID device, may identify that a mobile device is within a predetermined area. The RFID device may send a tag to the mobile device. The RFID may send a notification to a communicator that the tag has been sent. The RFID may acquire the encrypted configuration information and encrypted state information form the communicator. The RFID device may push the encrypted configuration information and the encrypted state information to the mobile device.

1 Claim, 5 Drawing Sheets

(51) Int. Cl.
*H04W 60/04* (2009.01)
*H04W 4/02* (2018.01)
*G01S 13/82* (2006.01)
*H04L 9/08* (2006.01)
*H04L 9/32* (2006.01)
*G06F 7/04* (2006.01)
*G06F 17/30* (2006.01)

(52) U.S. Cl.
CPC ......... *H04L 63/0442* (2013.01); *H04W 4/025* (2013.01); *H04W 60/04* (2013.01)

(56) References Cited

U.S. PATENT DOCUMENTS

| | | | |
|---|---|---|---|
| 8,655,575 | B2 | 2/2014 | Reghunath |
| 8,711,850 | B2 | 4/2014 | Kim et al. |
| 8,754,751 | B1 | 6/2014 | Picolli |
| 9,043,124 | B1 * | 5/2015 | Tran .................. G08G 1/02 701/117 |
| 9,069,653 | B2 | 6/2015 | Be et al. |
| 2006/0064233 | A1 | 3/2006 | Adachi et al. |
| 2006/0168644 | A1 * | 7/2006 | Richter ............. G06F 17/30876 726/2 |
| 2007/0167172 | A1 | 7/2007 | Kim et al. |
| 2010/0011211 | A1 * | 1/2010 | Anemikos ............... G06F 21/35 713/168 |
| 2010/0011212 | A1 * | 1/2010 | Anemikos ............... G06F 21/35 713/171 |
| 2012/0280836 | A1 | 11/2012 | Roesner |
| 2015/0052352 | A1 | 2/2015 | Dolev et al. |

OTHER PUBLICATIONS

Bhat et al., "Secure Communication With a Traffic Control System," U.S. Appl. No. 15/621,339, filed Jun. 13, 2017.
List of IBM Patents or Patent Applications Treated as Related, Feb. 2, 2018, 2 pgs.

* cited by examiner

SECURE COMMUNICATION WITH A TRAFFIC CONTROL SYSTEM

BACKGROUND

The present disclosure relates generally to the field of secure information transfer, and more specifically to verifying that the communication between two or more devices is secure before engaging in an information transfer.

A user may desire to automatically know traffic conditions while on a road. The user may use a mobile device to acquire the traffic condition information from a traffic controller near the road. Communication between the mobile device and the traffic controller may leave the traffic controller exposed to outside security risks and incorrect information may be sent to the mobile device.

SUMMARY

Embodiments of the present disclosure include a system and methods for securely transferring information between two or more devices. A processor may receive an indication form a radio frequency identification (RFID) device that a mobile device is in a predetermined area. The processor may send a private key on a first frequency at a first time to the mobile device. The processor may receive, in response to sending the private key, a communication request from the mobile device. The mobile device may contain a public decryption key. The processor may then send encrypted configuration information and encrypted state information to the mobile device.

In some embodiments, an RFID device may identify that a mobile device is within a predetermined area. The RFID device may send a tag to the mobile device. The tag may include a public decryption key and an identification number associated with the RFID device. The RFID may send a notification to a communicator that the tag has been sent. The RFID may acquire the encrypted configuration information and encrypted state information form the communicator. The RFID device may push the encrypted configuration information and the encrypted state information to the mobile device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
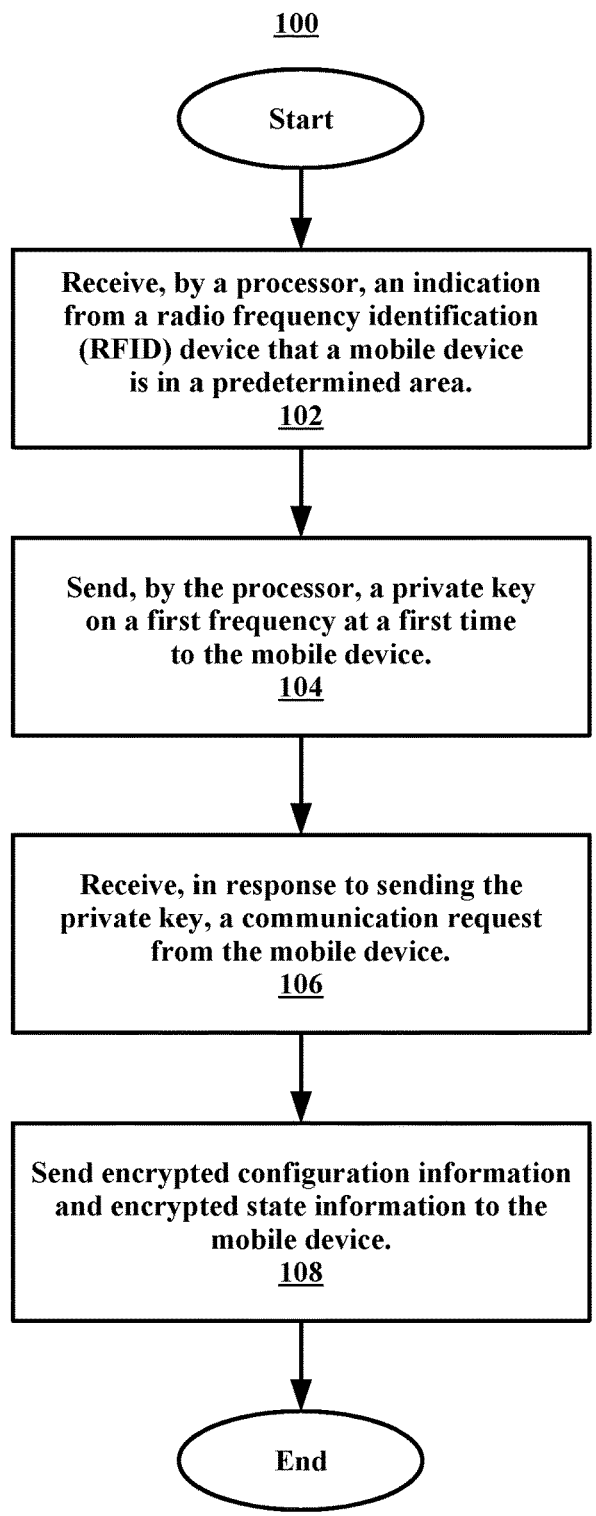
FIG. 1 illustrates a flowchart of an example method for securely sending configuration information and state information from a communicator to a mobile device, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of traffic information security, and more specifically to verifying that traffic information is being sent and/or received from a validated, secure source. While the present disclosure is not necessarily limited to such applications, various aspects of the disclosure may be appreciated through a discussion of various examples using this context.

Many mobile device (e.g., cellphones, Bluetooth radios, GPS devices, devices embedded in cars, etc.) users may be at a traffic intersection and want to know the duration of the traffic signal and/or other such traffic information. The information may be delivered to the user's mobile device via a traffic controller, but there may be no way of determining if the information transmitted by the traffic controller is secure. For example, an individual may send false information to the user's mobile device disguised as information from the traffic controller. This may be particularly problematic if a computer system is using the received information to react automatically (e.g., without human input), such as may be the case with driverless cars. A mobile device user may desire to have a secure communication between the user's mobile device and the traffic controller in order to assure proper traffic information is being relayed and/or relied upon.

In some embodiments, a processor may receive an indication from a radio frequency identification (RFID) device that a mobile device is in a predetermined area. The processor may send a private key on a first frequency at a first time to the mobile device. In some embodiments, the processor may receive, in response to sending the private key, a communication request from the mobile device. In some embodiments, the mobile device may contain a public decryption key (e.g., obtained from a traffic control institution, from an RFID device, a municipality, etc.).

In some embodiments, the processor may then send encrypted configuration information and encrypted state information to the mobile device. In some embodiments, the processor may encrypt the configuration information and state information using the private key and send the encrypted configuration and state information to the mobile device at the first time (e.g., the processor may originally send the encrypted configuration and state information without waiting for a response/communication request). In some embodiments, the encrypted configuration information may include a physical location of the RFID device (e.g., latitude/longitude, that the RFID is in the left-hand Northbound lane, etc.). In some embodiments, the encrypted state information may include an indication of a length of time of a sensor in relation to the physical location of the RFID device.

For example, a car may stop at an intersection and be on top of an RFID device that is embedded in the intersection's asphalt and that is 50 feet from the nearest stoplight. The RFID device may be a passive RFID device that may be activated by a user's mobile device, which may be inside the car. Upon activation, the RFID device may send an indication to an intelligent traffic controller communicator (ITCC) that may be communicatively coupled to a traffic controller (e.g., sometimes referred to as an intelligent traffic controller) that controls the traffic signals of the intersection. In response to receiving the indication of a vehicle in the intersection, the ITCC may send a private key on a first frequency of 800 MHz (e.g., a frequency recognizable by most mobile devices). The private key may be sent in order to identify the ITCC as a verified transmitter of traffic information.

The mobile device may receive the private key and send a communication request back to the ITCC. The mobile device may additionally obtain a public decryption key (e.g., from the RFID device, a certified traffic municipality application, website found by or on the mobile device, etc.). The ITCC may receive the communication request and send encrypted information containing the physical location of the RFID device on which the car is on top of, and the length of time of the traffic signal in relation to the physical location of the RFID device (e.g., how long the light associated with the mobile device's traffic lane is going to be red). The information may be used by the mobile device to indicate to the user that the car is 50 feet away from the cross-section of the intersection and that the user may be waiting another 90 seconds before the signal changes.

In some embodiments, the processor may identify that the mobile device is unable to receive the private key on the first frequency. The processor may then send the private key on a second frequency at a second time. The processor may identify that the mobile device received the private key on the second frequency by receiving the communication request.

For example, a jogger with a music player may be stopped at a crosswalk and an RFID device embedded in the concrete of the sidewalk may be activated and transmit a signal to an ITCC. The ITCC may transmit a private key on a first frequency of 800 MHz and receive no response (e.g., communication request from the music player). The ITCC may then, 1 second later, send the private key on a second frequency of 800 kHz (e.g., a recognizable radio frequency). The music player may be able to identify the frequency and interpret the private key. The music player may then transmit back to the ITCC a communication request. The communication request may establish a secure connection between the music player and the ITCC that may allow for the secure transmission of encrypted information. In some embodiments, the ITCC may then send encrypted configuration information and encrypted state information to the music player. The music player may analyze the information and relay an audio message to the jogger indicating that jogger must wait 20 seconds for the crosswalk signal to change.

In some embodiments, the processor may determine, in response to sending the private key on the first frequency at the first time, that the mobile device did not receive the private key. This determination may be made by the processor not receiving the communication request. In some embodiments, the processor may resend the private key on the first frequency at a second time. The processor may determine, in response to resending the private key on the first frequency at the second time, that the mobile device did not receive the private key. In some embodiments, the processor may send the private key on a second frequency at a third time.

For example, the ITCC after receiving an indication from an RFID device that a mobile device is stopped at an intersection, the ITCC may send a private key on a 500 kHz frequency, then after not receiving a response (e.g., a communication request) from the mobile device within 1 second, the ITCC may again send the private key on the 500 kHz frequency. After not receiving a response again within another 1 second, the ITCC may send the private key on a 500 GHz frequency.

In some embodiments, the processor may receive a second indication from the RFID device that a second mobile device is in the predetermined area. The processor may send the private key on a second frequency at the first time. The processor may receive, in response to sending the private key on the second frequency, a second communication request from the second mobile device on the second frequency. In some embodiments, the second mobile device may contain the public decryption key. The processor may then send encrypted configuration information and encrypted state information to the second mobile device.

For example, a jogger and a vehicle may arrive at an intersection at the same time and an RFID device embedded in the asphalt near the corner of the intersection may identify two devices at that corner (e.g., the jogger's music player and the vehicle's Bluetooth radio). An ITCC may receive two indications from the RFID; the ITCC may then transmit a private key on a 300 kHz frequency for the music player to intercept and a 300 GHz frequency for the Bluetooth radio to intercept at a first time. The ITCC may receive a communication request from both devices and send encrypted information to both devices.

In some embodiments, the processor may resend the private key on the first frequency and the second frequency at a second time (e.g., resending for the private key). The processor may receive, in response to resending the private key, a third communication request from a third mobile device. The third mobile device may contain the public decryption key. The processor may send encrypted configuration information and encrypted state information to the third mobile device.

Following the above example, the ITCC may receive an indication that the jogger and the vehicle have arrived in the intersection and may have sent the private key over the first and second frequencies. However, the ITCC may not receive a communication request from either device owned by the jogger or in the vehicle. The ITCC may then resend the private key five seconds later on both the first and second frequencies, however while waiting for a response and before resending the private key, the light signal may have changed and the jogger and vehicle may have left. A cyclist may end up at the intersection now and the cyclists GPS device may identify the resent private key from the first or second frequencies and send a communication request to the ITCC. The ITCC may then send encrypted information to the GPS device and the GPS device may present the information to the cyclist, indicating that they now have 12 seconds to cross the road. In some embodiments, the mobile devices may directly send the public key to the ITCC, which in turn, may decrypt the information before sending the information to the mobile devices.

In some embodiments, a radio frequency identification (RFID) device may identify that a mobile device is within a predetermined area (e.g., a crosswalk, a road intersection, a turn lane, a bike lane, etc.). The RFID device may send a tag to the mobile device. In some embodiments, the tag may include a public decryption key and an identification number associated with the RFID device. The RFID device may also send a notification to a communicator (e.g., an intelligent traffic controller communicator [ITCC]) that the tag has been sent. The RFID device may acquire encrypted configuration information and encrypted state information from the communicator. The RFID device may push the encrypted configuration information the encrypted state information to the mobile device. In some embodiments, the RFID device may be an active RFID device (e.g., is battery powered, is powered by a photovoltaic cell, etc.) in order to be able to push the encrypted information.

In some embodiments, the encrypted configuration information may include a physical location of the RFID device. In some embodiments, the encrypted state information may include an indication of a length of time of a sensor (e.g., a crosswalk signal, a traffic light, etc.) in relation to the physical location of the RFID device. For example, a dog walker with a cellphone may be standing at an intersection waiting to cross the road. The cellphone may contain an application that has the cellphone send out a frequency readable by passive RFID devices, and an RFID device embedded in the concrete near the intersection may identify the frequency. The RFID device, upon being activated by the frequency of the cellphone, may send a tag to the cellphone.

The cellphone may read the tag and identify that the tag consists of two parts, a public decryption key and an identification number associated with the RFID device. The RFID, in addition to sending the tag to the cellphone, may send a notification to an ITCC that the tag has been sent. The sending of the notification by the RFID device may indicate to the ITCC that the cellphone is near the intersection, and the ITCC may then send encrypted configuration information and state information to the RFID device. Upon acquiring the encrypted information, the RFID may push the encrypted information to the cellphone.

The cellphone may then use the public decryption key from the tag to decrypt the encrypted information. In some embodiments, the encrypted information may be sent with the identification number, and the cellphone may additionally check that the identification number initially received with the tag also matches the identification number sent with the encrypted information. This may verify that the information received is secure. Additionally, by not having the ITCC in direct communication with the cellphone, the ITCC is less likely to have its security compromised.

In some embodiments, the RFID device may not have enough memory to store the tag and push the encrypted information at the same time. The ITCC may then direct the RFID device to delete the tag and write the encrypted information to be pushed to the cellphone. In some embodiments, the RFID may then delete the encrypted information after pushing it to the cellphone and regenerate the tag.

In some embodiments, the mobile device may generate a status report using the encrypted configuration information and the encrypted state information. In some embodiments, the mobile device may decrypt the configuration information and the state information using the public decryption key. In some embodiments, the mobile device may then present the status report to a user. Following the example above, after decrypting the configuration information and the state information, the cellphone may alert the dog walker (e.g., by using a text message, vibrating, message on the display, etc.) that the crosswalk signal will be changing in two minutes and that it is not safe to cross until then.

In some embodiments, the RFID device may contain a processor that may be programmed to generate the identification number associated with the RFID device. In some embodiments, the identification number may randomly be generated by a pseudo-random number generator (PRNG) during each cycle of a traffic indicator (e.g., a stoplight, a crosswalk signal, etc.) associated with the communicator (e.g., ITCC). For example, an RFID device may be embedded in the asphalt of an intersection that has a stoplight cycle of 3 minutes (e.g., the lights cycle from red to green, and vice-a-versa every 3 minutes) and every 3 minutes the communicator indicates to the RFID device that the RFID device may need to generate a new identification number. This may allow for the communicator and RFID device to maintain constant communication and reduce issues with lagged information being sent to and/or from the RFID device and the communicator. It may also assure users that the information being relayed is from a constantly verified source (e.g., the communicator and the RFID device).

In some embodiments, the RFID device may generate a database table. In some embodiments, the communicator may generate the database table. In some embodiments, the database table may include a seed number used by the PRNG for generating the identification number. In some embodiments, the RFID device may save the seed number and the identification number of each cycle in the database table. Following the above example, the RFID may use a first seed number to generate a first identification number for the first 3 minutes of the first light cycle, then the RFID may save this information in order to not repeat identification numbers with other RFID devices in the area.

The RFID device may then use a second seed number to generate a second identification number for the second 3 minutes of the second light cycle. The RFID device may additionally save the second seed number and the second identification number. The database table may allow for accurate communication between the RFID device, communicator, and/or mobile device. It may allow for this in case the light cycle changes during the pushing of information so the mobile device can still verify the authenticity of the encrypted information.

In some embodiments, the mobile device, in response to the generation of the status report, may disable the text messaging functions of the mobile device for the duration of the traffic indicator associated with the state information. For example, the mobile device may decrypt the encrypted information and generate a status report indicating that the traffic light will remain red for 45 seconds and the mobile device may lock the text messaging function of itself in order for the user of the mobile device to remain a focused driver. In some embodiments, the mobile device may continue to lock its text messaging function until it receives no indication of encrypted information from an RFID and/or communicator.

In some embodiments, configuration information in an intelligent traffic controller and a corresponding ITCC (e.g., that transmits the information to a mobile device for the intelligent traffic controller) may be configured by an approved operator (e.g., a local municipality). The configuration information may define the intersection configuration as well as all input devices and output devices contained in the intersection (e.g., the intelligent traffic controller, the ITCC, the RFIDs, traffic signals, etc.). In some embodiments, the ITCC may also store the RFID locations placed throughout the intersection.

In some embodiments, the ITCC may be hardwired to the intelligent traffic controller via an output controller and the ITCC may receive state information and configuration information from the intelligent traffic controller on a periodic basis (e.g., every $1/10^{th}$ of a second, etc.). The ITCC may then encrypt the state information and the configuration information using the ITCC's private key. In some embodiments, this configuration of the intelligent traffic controller and the ITCC may stop all incoming wireless data; insuring the security of the intelligent traffic controller as a self-contained, outbound only communication system.

In some embodiments, as a mobile device enters an intersection (e.g., either in a vehicle or as walk-up traffic), the mobile device may detect and identify a tag associated with a nearest embedded RFID. The mobile device may then parse the tag into two parts: a public decryption key and the identifying number that may identify which RFID was detected. The mobile device may then receive configuration and state information broadcasted by an ITCC. In some embodiments, the mobile device, using the public decryption key received from the RFID, may decrypt the state and configuration information. The decryption may authenticate the state and configuration information as coming from the ITCC governing the controlled intersection.

In some embodiments, the mobile device may then, using the identification number of the detected RFID, determine the mobile device's location within the intersection. In some embodiments, if the mobile device receives multiple instances of state and configuration information, the state and configuration information received with the corresponding RFID identifying number may be used. This may occur if two traffic signals are within close proximity of one another. In some embodiments, the mobile device may then, knowing its location within the intersection, interpret the state of the intersection (e.g., if traffic is stopped, etc.) and how it may affect the user of the mobile device (e.g., traffic will be stopped for 2 minutes, etc.).

In some embodiments, after the mobile device identifies its position in the intersection and the status of the sensors and lights or other intersection devices, it may perform programmed tasks to inform the user of a GPS location, intersection configuration, and state information. For instance, an intelligent car (e.g., connected to a satellite system, etc.) may notify a driver of how long the light will be red, or a mobile phone may disable, or a jogger may be informed about the wait time, enabling an alternative exercise. Additionally, drivers may be alerted to on-coming emergency vehicles and provided suggestions on their best course of action to get out of the way.

In other embodiments, the mobile device may send a message to an ITCC containing an RFID's identification number. This may allow the ITCC to interpret the state information and broadcast the specific data relevant to the mobile device (e.g., how long the light will be red). This may move the interpretation and/or decryption of the state and configuration information from the mobile device to the ITCC. This may ensure a reliable interpretation of the traffic intersection data.

In other embodiments, a public key may be disseminated to the mobile device through a trusted source (e.g., a municipality). This may occur at the time of vehicle registration or from a trusted application store that could authenticate the municipality or other governing source holding the public/private key pairs. This may have the advantage of being able to roll (e.g., periodically change the public keys using a PRNG or random number generator, etc.) the public keys to ensure the state and configuration information remains timely. This may additionally, allow an RFID to only disseminate its location in the intersection.

Referring now to FIG. 1, illustrated is a flowchart of an example method 100 for securely sending configuration information and state information from a communicator to a mobile device, in accordance with embodiments of the present disclosure. In some embodiments, a processor may perform the method 100. In some embodiments, a server may perform the method 100. In some embodiments, the method 100 may begin at operation 102.

At operation 102, a processor may receive an indication from a radio frequency identification (RFID) device that a mobile device is in a predetermined area. In some embodiments, after operation 102, the method 100 may proceed to operation 104. At operation 104 the processor may send a private key on a first frequency at a first time to the mobile device.

In some embodiments, after operation 104, the method 100 may proceed to operation 106. At operation 106, the processor may receive, in response to sending the private key, a communication request from the mobile device. In some embodiments, the mobile device may contain a public decryption key. In some embodiments, after operation 106, the method 100 may proceed to operation 108. At operation 108, the processor may send encrypted configuration information and encrypted state information to the mobile device. In some embodiments, the mobile device, using the public decryption key, may decrypt the encrypted configuration and state information.

For example, a motorcyclist with a Bluetooth headset may be stopped 100 yards from a red light at an intersection and an RFID device embedded in the asphalt of the road may identify that the Bluetooth headset is in the RFID device's range. The RFID device may send an indication that is received by an intelligent traffic controller communicator (ITCC) that the Bluetooth headset has been identified. The ITCC may then send a private key on 2430 MHz frequency (e.g., an acceptable range for Bluetooth devices) to the Bluetooth headset.

The Bluetooth headset may acknowledge the reception of the private key by sending a communication request to the ITCC. The communication request may establish a secure communication transfer link between the Bluetooth headset and the ITCC. In some embodiments, the Bluetooth headset may be paired with another mobile device that has an application that has obtained a public decryption key from a local municipality dealing with traffic information. Upon receiving the communication request from the Bluetooth headset, the ITCC may send encrypted traffic information to the Bluetooth headset. The Bluetooth headset and/or the paired mobile device may use the public decryption key to decrypt the traffic information. In some embodiments, the Bluetooth headset may read the amount of time before the red light changes.

In some embodiments, the Bluetooth headset with its paired mobile device may use the traffic information to determine how long before the motorcyclist moves 100 yards plus the length of the intersection (e.g., instead of only indicating that the light will turn in 20 seconds, the motorcyclist may be given an indication that they have 20 seconds to wait plus the time to move 100 yards and cross the intersection, which may average 35 seconds).

Figure 2:
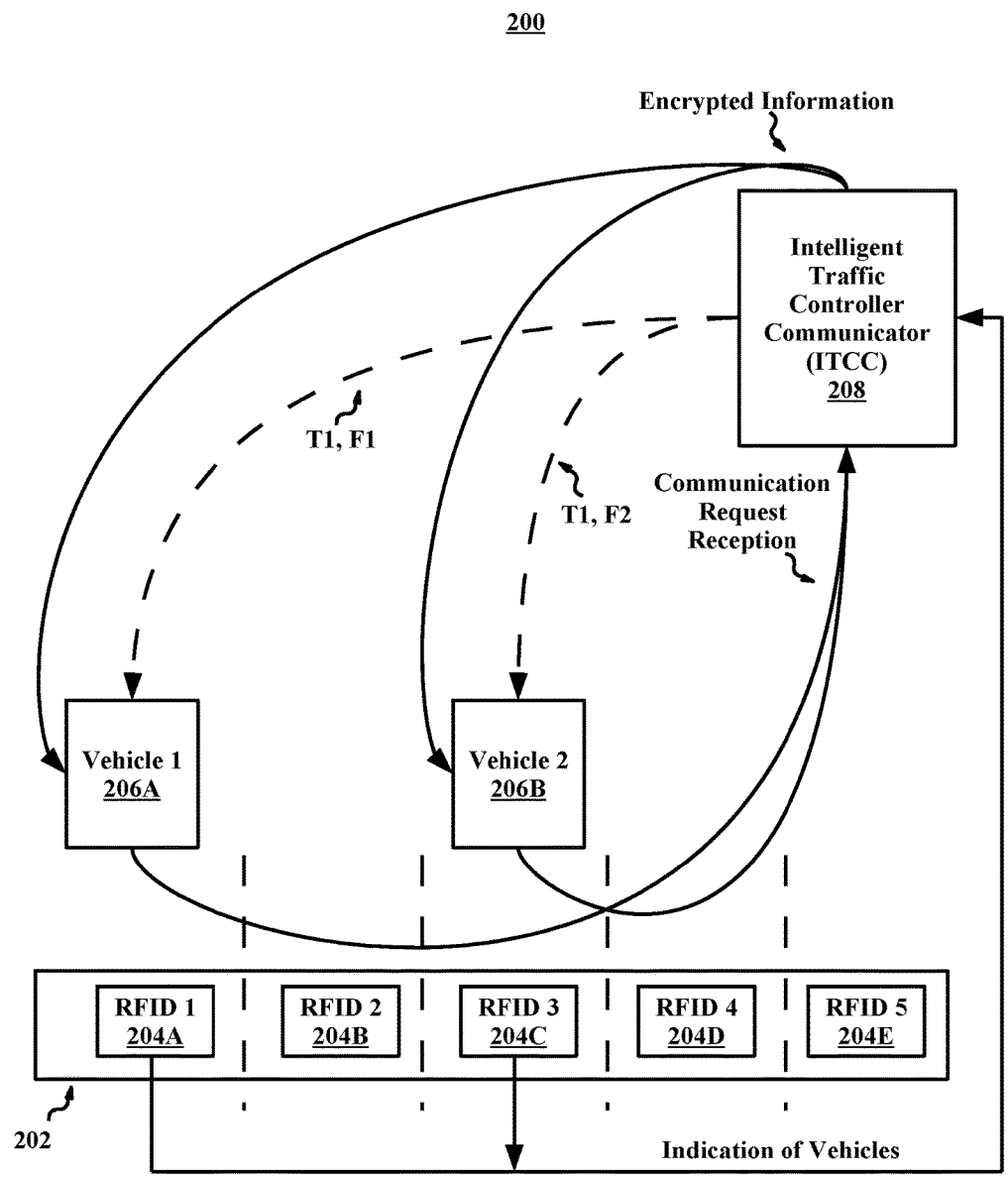
FIG. 2 illustrates an example system for securely sending and receiving traffic information on different frequencies, in accordance with embodiments of the present disclosure.

Referring now to FIG. 2, illustrated is an example system 200 for securely sending and receiving traffic information on different frequencies, in accordance with embodiments of the present disclosure. In some embodiments, the system 200 may include a road surface 202 (e.g., concrete, asphalt, brick, etc.), a first vehicle 206A (e.g., a bicycle, a car, a van, etc.), a second vehicle 206B, and an intelligent traffic controller communicator (ITCC) 208. In some embodiments, the road surface 202 may include a first RFID 204A, a second RFID 204B, a third RFID 204C, a fourth RFID 204D, and a fifth RFID 204E.

In some embodiments, the first vehicle 206A and the second vehicle 206B may be stopped on the same road surface 202. The first vehicle 206A may be stopped in the proximity of the first RFID 204A located in a first lane and the second vehicle may be stopped in the proximity of the third RFID 204C located in a third lane. In some embodiments, the first and third RFIDs 204A and 204C may send an indication of vehicles to the ITCC 208. The ITCC, in response to the indication of two vehicles being identified on the road surface 202 (e.g., by there being an indication from both the first RFID 204A and the second RFID 204C), may then at a first time T1 send a private key on a first frequency F1 and a second frequency F2. For example, the ITCC may send the private key on a 300 GHz frequency to the first vehicle 206A and a 270 GHz frequency to the second vehicle 206B, both recognizable radio signals. This may allow the ITCC to accurately identify which vehicle it is communicating with at any given time and to identify that two legitimate public keys are being relayed to it.

In some embodiments, the first frequency F1 may be associated with the first RFID 204A and the second frequency F2 may be associated with the third RFID 204C. The frequencies F1 and F2 may respectively be associated to the RFIDs 204A and 204C to easily allow the ITCC to identify which vehicle is located in which traffic lane. In some embodiments, the first frequency F1 and the second frequency F2 may be the same frequency.

In some embodiments, after sending the private key at the first time T1 on the first and second frequencies F1 and F2. The first vehicle 206A and the second vehicle 206B may each send a communication request to the ITCC. In some embodiments, upon reception of the communication requests from both the first vehicle 206A and the second vehicle 206B, the ITCC may then send encrypted information to both the first vehicle 206A and the second vehicle 206B. In some embodiments, the encrypted information may include traffic related information that details the traffic components of an intersection controlled by the ITCC (e.g., traffic lights, crosswalk signals, etc.). The system 200 may provide a secure way for traffic information to be transferred between and relayed between the ITCC and multiple vehicles.

Figure 3:
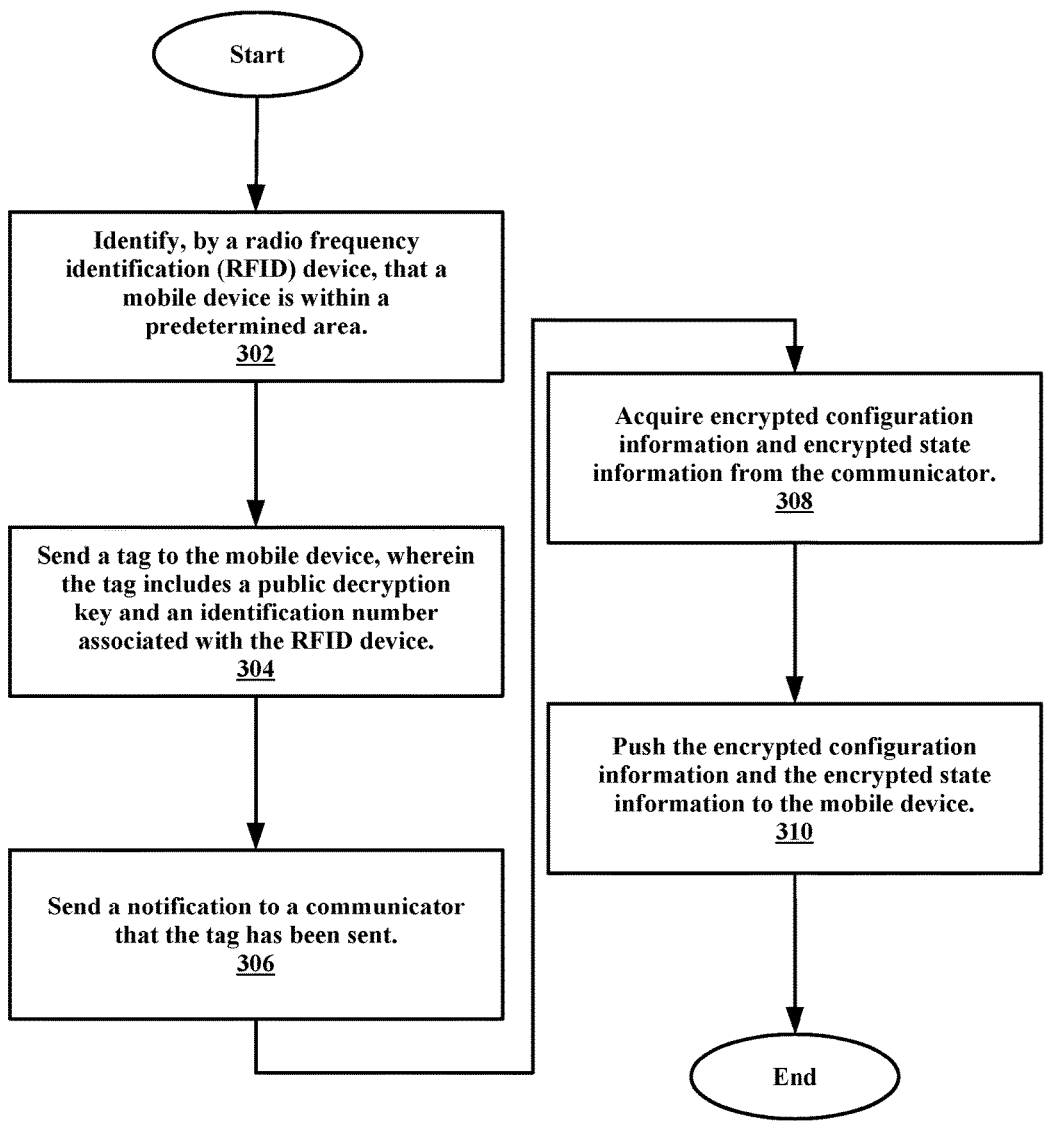
FIG. 3 illustrates a flowchart of an example method for pushing encrypted information to a mobile device, in accordance with embodiments of the present disclosure.

Referring now to FIG. 3, illustrated is a flowchart of an example method 300 for pushing encrypted information to a mobile device, in accordance with embodiments of the present disclosure. In some embodiments, a processor may perform the method 300. In some embodiments, a server may perform the method 300. In some embodiments, the method 300 may begin at operation 302.

At operation 302, a radio frequency identification (RFID) device may identify that a mobile device is within a predetermined area. After operation 302, the method 300 may proceed to operation 304. At operation 304, the RFID device may send a tag to the mobile device. In some embodiments, the tag may include a public decryption key and an identification number associated with the RFID device.

After operation 304, the method 300 may proceed to operation 306. At operation 306 the RFID may send a notification to a communicator (e.g., an ITCC) that the tag has been sent. In some embodiments, the notification may be sent to the communicator at the same time as sending the tag to the mobile device. After operation 306, the method 300 may proceed to operation 308.

At operation 308, the RFID may acquire encrypted configuration information and encrypted state information from the communicator. After operation 308, the method 300 may proceed to operation 310. At operation 310 the RFID may push the encrypted configuration information and the encrypted state information to the mobile device.

Figure 4:
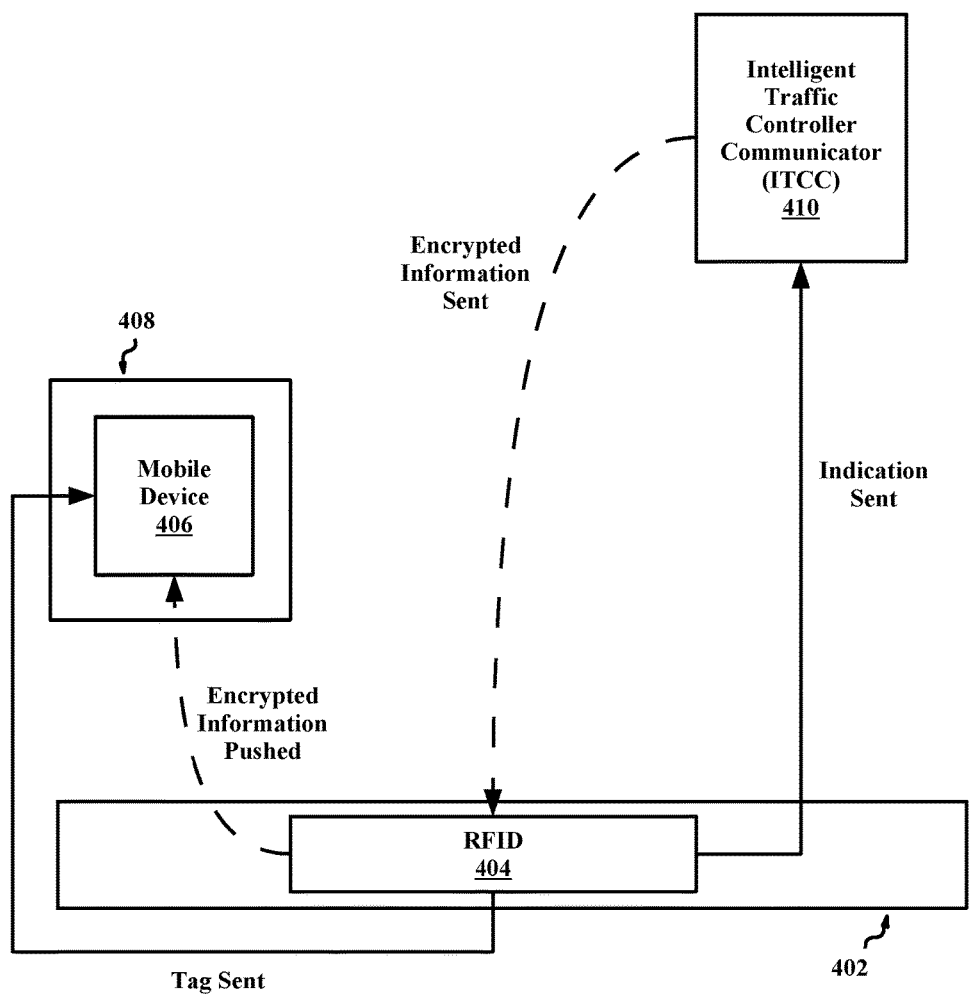
FIG. 4 illustrates an example system for using an RFID as an intermediary to securely transmit information between an ITCC and a mobile device, in accordance with embodiments of the present disclosure.

Referring now to FIG. 4, illustrated is an example system 400 for using an RFID as an intermediary to securely transmit information between an ITCC and a mobile device, in accordance with embodiments of the present disclosure. In some embodiments, the system 400 may include a road surface 402, a vehicle 408, and an intelligent traffic controller communicator (ITCC) 410. In some embodiments, the road surface 402 may include an RFID 404 and the vehicle 408 may include a mobile device 406.

In some embodiments, the RFID 404 may identify the mobile device 406 is within a predetermined area of the road surface 402. The RFID 404, upon determining that the mobile device 406 in the predetermined area may then send a tag to the mobile device 408. In some embodiments, the tag may include a decryption key. In some embodiments, the RFID 404 may also send an indication to the ITCC 410 that the mobile device is in the predetermined area. In some embodiments, the tag and the indication may be sent at the same time.

In some embodiments, after receiving the indication form the RFID 404, the ITCC 410 may send encrypted information to the RFID 404. The RFID 404 may then push the encrypted information to the mobile device 406. In some embodiments, the mobile device 406 may use the decryption key from the tag to decrypt the encrypted information pushed from the RFID 404.

For example, a car with a GPS system may be stopped at a four-way intersection and an RFID device located in the asphalt of the intersection may identify the GPS system as being in the area of the four-way intersection. The RFID device may send a tag to the GPS system with a decryption key and a unique number associated with the RFID device. The RFID may also send an indication to an ITCC in the area that the GPS system is in the area. The ITCC, in response to the indication, may sent encrypted traffic information to the RFID device and the RFID device may push the encrypted traffic information with the unique number to the GPS system.

The GPS system may identify the unique number as the same unique number from the tag and determine that the encrypted traffic information is from a secure source and proceed to use the decryption key to decrypt the traffic information. This system allows the encrypted traffic information to not be subject to influence from outside sources and only decrypted upon receipt from by the GPS system.

Figure 5:
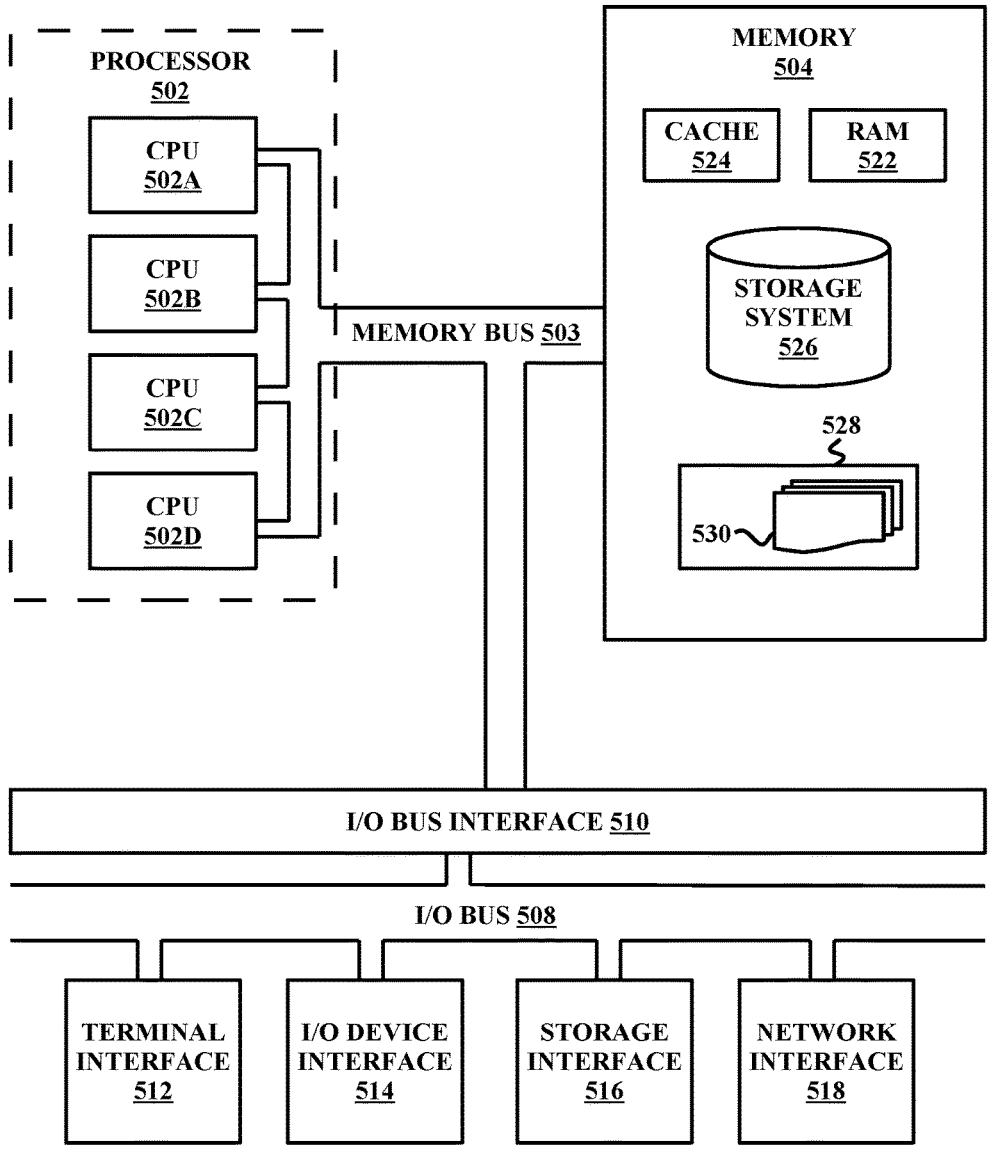
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
   receiving, by a processor, an indication from a radio frequency identification (RFID) device that a mobile device is in a predetermined area, wherein the mobile device contains a public decryption key, and wherein the public decryption key is obtained from a regulatory entity;
   sending, by the processor, a private key on a first frequency at a first time to the mobile device, the private key verifying an identity of a controller, wherein the controller is maintained by the regulatory entity, and wherein the first frequency is within a first frequency range of 3 kHz to 300 GHz;
   receiving, by the processor and in response to sending the private key on the first frequency, a communication request from the mobile device to communicate with the controller on the first frequency;
   establishing, via the processor, a communication connection between the mobile device and the controller on the first frequency;
   sending, from the controller, encrypted configuration information and encrypted state information to the mobile device, wherein the encrypted configuration information includes a physical location of the RFID device and the encrypted state information includes an indication of a length of time of a sensor in relation to the physical location of the RFID device;
   receiving, by the processor, a second indication from the RFID device that a second mobile device is in the predetermined area, wherein the second mobile device contains the public decryption key;
   sending, by the processor, the private key on a second frequency at the first time to the second mobile device, wherein the second frequency is within a second frequency range of 2402 MHz to 2480 MHz;
   receiving, by the processor and in response to sending the private key on the second frequency, a second communication request from the second mobile device to communicate with the controller on the second frequency;
   establishing, via the processor, a second communication connection between the second mobile device and the controller on the second frequency;

sending, from the controller, the encrypted configuration information and the encrypted state information to the second mobile device;
sending, by the processor, the private key on the first frequency and the second frequency at a second time;
identifying, by a third mobile device, that the private key is being sent on the first frequency, wherein the third mobile device contains the public decryption key;
receiving, by the processor and in response to sending the private key on the first frequency and the second frequency at the second time, a third communication request from the third mobile device to communicate with the controller on the first frequency;
establishing, via the processor, a third communication connection between the third mobile device and the controller on the first frequency; and
sending, from the controller, the encrypted configuration information and the encrypted state information to the third mobile device.

\* \* \* \* \*